July 4, 1939.  A. A. LEVIN  2,164,827
OPTICAL SYSTEM
Filed Nov. 23, 1936
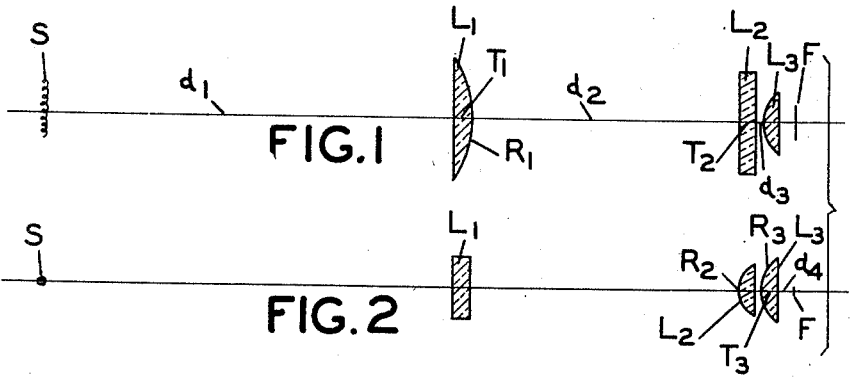
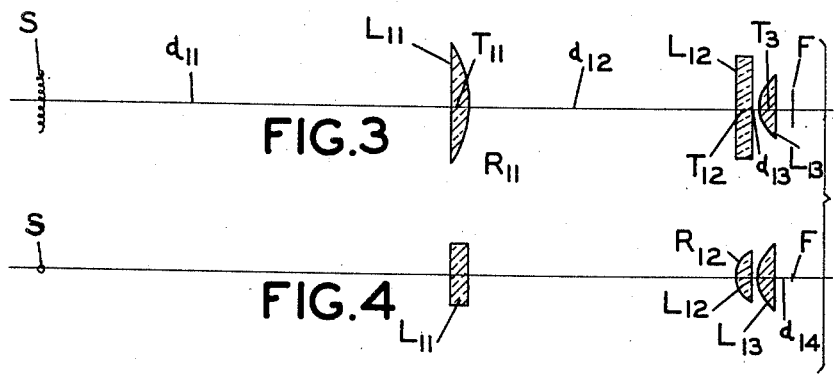
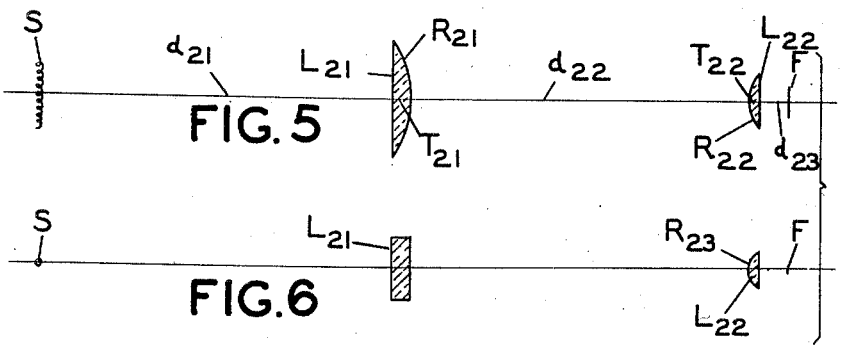
AARON A. LEVIN
INVENTOR.
BY
ATTORNEYS Patented July 4, 1939

2,164,827

UNITED STATES PATENT OFFICE 2,164,827

OPTICAL SYSTEM

Aaron A. Levin, Rochester, N. Y., assignor to Bausch & Lomb Optical Company, Rochester, N. Y., a corporation of New York Application November 23, 1936, Serial No. 112,215

3 Claims. (Cl. 88—24)

The present invention relates to optical systems and more particularly to linear image forming optical systems for use in sound reproduction or the like.

One of the objects of the present invention is to provide a new and improved linear image forming optical system which is simple and inexpensive to manufacture, yet efficient and accurate in operation. Another object is to provide such a system having a relatively short mechanical length. A further object is to provide such a system having a high numerical aperture. A still further object is to provide such a system having only simple uncorrected lens elements. These and other objects and advantages reside in certain novel features of construction, arrangement and combination of parts as will hereinafter be more fully set forth and pointed out in the appended claims.

Referring to the drawing:

Fig. 1 is a horizontal section of one embodiment of my invention.

Fig. 2 is a vertical section thereof.

Fig. 3 is a horizontal section of a second embodiment of my invention.

Fig. 4 is a vertical section of the embodiment shown in Fig. 3.

Fig. 5 is a horizontal section of a third embodiment of my invention.

Fig. 6 is a vertical section of the embodiment shown in Fig. 5.

In the embodiment shown in Figs. 1 and 2, the linear light source S is imaged on the film F with a reduction of 2 to 1 in the horizontal plane and a reduction of 18 to 1 in the vertical plane. The constants of the lens system are given in the following table:

| | | Focal lengths |
|---|---|---|
| $d_1=40.9$ | $R_2=2.80$ | $L_1=20.3$ |
| $T_1=1.7$ | $d_3=0.7$ | $L_2=5.4$ |
| $R_1=10.5$ | $T_3=1.6$ | $L_3=7.5$ |
| $d_2=26.9$ | $R_3=3.86$ | |
| $T_2=1.6$ | $d_4=1.6$ | |

The system shown in Figs. 1 and 2 thus consists of three simple lenses, each having one plane surface. The cylindrical lens $L_1$ and the spherical lens $L_3$ combine to image the source S in the horizontal plane while the cylindrical lens $L_2$ and the spherical lens $L_3$ combine to image the source S in the vertical plane. The distance $d_4$ is short in relation to the width of the lens $L_3$ so that the numerical aperture of the system is high.

The embodiment shown in Figs. 3 and 4 also consists of three simple lenses each having one plane surface. The constants of this system are given in the following table:

| | | Focal lengths |
|---|---|---|
| $d_{11}=40.9$ | $R_{12}=2.8$ | $L_{11}=20.3$ |
| $T_{11}=1.7$ | $d_{13}=0.7$ | $L_{12}=5.4$ |
| $R_{11}=10.5$ | $T_{13}=1.6$ | $L_{13}=7.5$ |
| $d_{12}=26.9$ | $d_{14}=1.6$ | |
| $T_{12}=1.6$ | | |

The embodiment shown in Figs. 3 and 4 is identical with that shown in Figs. 1 and 2 except that in the first-mentioned embodiment, the lens $L_{13}$ is paraboloidal instead of spherical as is the lens $L_3$. This paraboloidal lens $L_{13}$ improves the optical properties of the system but this advantage is offset by the increased difficulty and cost of manufacture.

In the embodiment shown in Figs. 5 and 6, the two front lenses of the preceding embodiments are combined into a single toric lens. The constants of this system are as follows:

| | | Focal lengths |
|---|---|---|
| $d_{21}=35.0$ | $T_{22}=1.6$ | $L_{21}=19.35$ |
| $T_{21}=1.8$ | $R_{22}=4.0$ | $L_{22}$ horizontal$=7.75$ |
| $R_{21}=10.0$ | $R_{23}=1.9$ | $L_{22}$ vertical$=3.67$ |
| $d_{22}=33.8$ | $d_{23}=2.8$ | |

All three of the modifications shown have a cylindrical component adjacent the light source with its cylinder axis perpendicular to the axis of the source, a second cylindrical component with its cylindrical axis perpendicular to the axis of the first component, and a symmetrical component. In each system each lens is a single element having one plane surface and in each system only one image of the source S is formed.

From the foregoing it is apparent that I am able to attain the objects of my invention and provide a simple, efficient and inexpensive optical system for sound reproducing units which has a relatively short overall length and a relatively high numerical aperture. Various modifications can, of course, be made without departing from the spirit of my invention or the scope of the appended claims.

I claim:

1. A linear image forming optical system for sound recording and reproducing units comprising a positive cylindrical lens, a second positive cylindrical lens spaced from the first cylindrical lens and having its axis perpendicular to the axis of said first cylindrical lens, and a positive spherical lens located closely adjacent the second cylindrical lens on the side opposite the first cylindrical lens, the conjugate foci of the first cylindrical lens and the spherical lens and those of the second cylindrical lens and the spherical lens being substantially coincident, said lenses being all simple lenses.

2. An illuminating system for forming a narrow line of light at an image plane for sound recording or reproducing, comprising a linear source of light, a positive cylindrical lens having its axis perpendicular to the axis of said source of light and spaced from said source of light to form an image of said source beyond said image plane, a second positive cylindrical lens having its axis perpendicular to the first cylindrical lens, said second cylindrical lens being positioned between the first cylindrical lens and the image plane to form an image of said source beyond said image plane, and a positive spherical lens positioned between said second cylindrical lens and said image plane to bring the image formed by the first cylindrical lens to a focus at said image plane.

3. An illuminating system for forming a narrow line of light at an image plane for sound recording or reproducing, comprising a linear source of light, a positive cylindrical lens having its axis perpendicular to the axis of said source of light and spaced from said source of light to form an image of said source beyond said image plane, a second positive cylindrical lens having its axis perpendicular to the first cylindrical lens, said second cylindrical lens being positioned between the first cylindrical lens and the image plane to form an image of said source beyond said image plane, and a positive spherical lens positioned between said second cylindrical lens and said image plane to bring the image formed by the first cylindrical lens to a focus at said image plane, each of said lenses consisting of a single element.

AARON A. LEVIN.